Aug. 19, 1969  J. K. BARRY  3,461,772
BARBED PLASTIC RIVET
Filed May 2, 1967  2 Sheets-Sheet 1
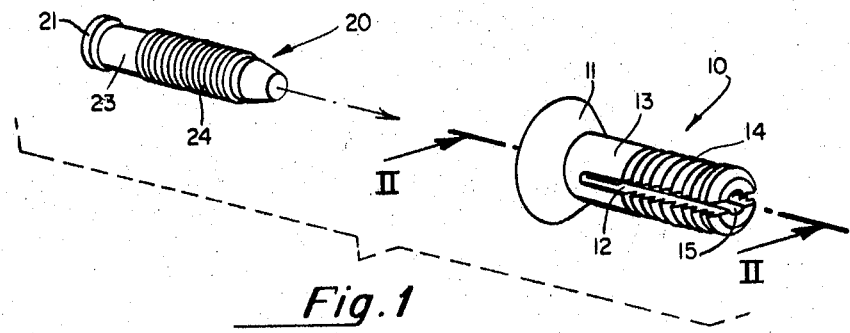
Fig.1
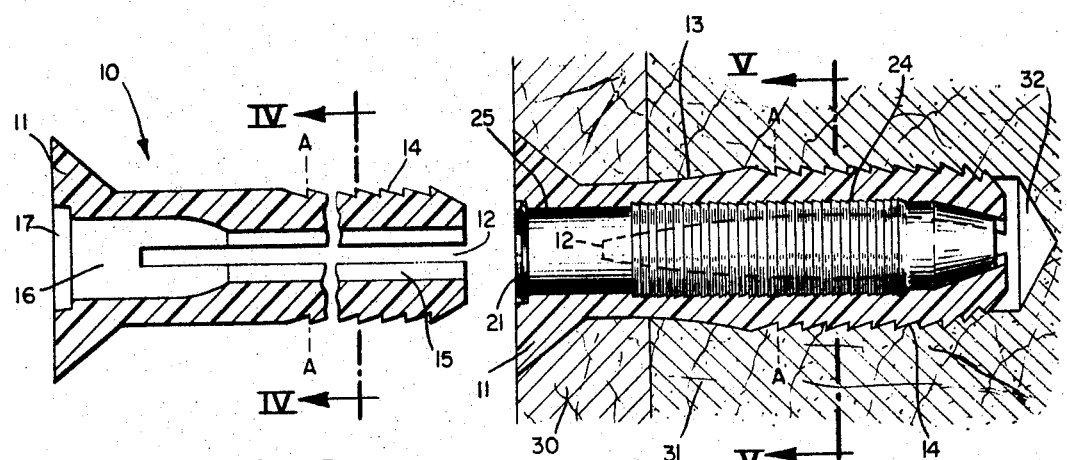
Fig.2  Fig.3
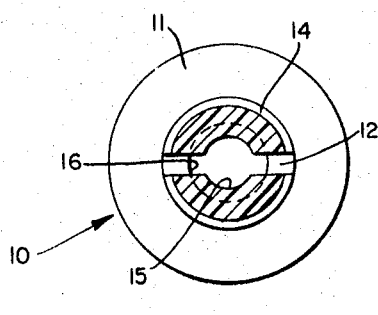  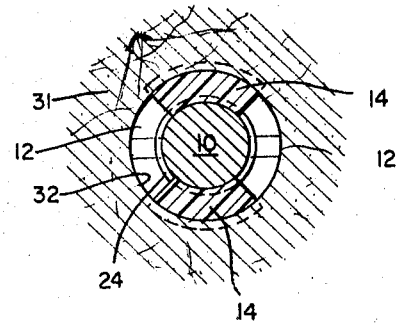
Fig.4  Fig.5
INVENTOR.
JOHN K. BARRY
BY
Paul + Paul
ATTORNEYS.

Aug. 19, 1969    J. K. BARRY    3,461,772
BARBED PLASTIC RIVET

Filed May 2, 1967    2 Sheets-Sheet 2

INVENTOR.
JOHN K. BARRY

BY

Paul + Paul
ATTORNEYS.

United States Patent Office 3,461,772
Patented Aug. 19, 1969

3,461,772
BARBED PLASTIC RIVET
John K. Barry, Springfield, Pa., assignor to Southco, Inc., Lester, Pa., a corporation of Delaware
Filed May 2, 1967, Ser. No. 635,603
Int. Cl. F16b 13/10, 15/06
U.S. Cl. 85—83                    1 Claim

ABSTRACT OF THE DISCLOSURE

A blind-drive plastic rivet has a head and a slotted shank. The lower portion of the rivet shank is externally barbed. An axial hole extends through the head and through or at least partially into the rivet shank for receiving a metal spreader pin having a head and shank. The shank of the expander pin has annular external barbs for an extended portion of its length so that when the pin is driven fully into the plastic rivet the barbs of the pin are on both sides of the dividing line between the lower barbed portion of the rivet shank and its upper unbarbed portion. The barbs on the expander pin have gently sloping lead-in angles with sharp crests and an abrupt back angle.

BACKGROUND OF THE INVENTION

Field of the invention

The invention relates to blind-drive barbed plastic rivets used, for example, as liner rivets for cargo containers and truck trailers, or as wall anchors or wall fasteners for attaching various things to wood, plaster, or masonry walls. Such blind-drive rivets employ expander pins for expanding the plastic rivet into the wood panel or wall or other material.

Description of the prior art

A search of the prior art has revealed a number of patents directed to rivets of the type here involved. Of the prior art patents the most pertinent appear to be Wisz 3,199,398, Luhm 3,044,340, Potruch 3,022,701, Barry et al. 2,877,682 and Raeger 1,234,487.

SUMMARY OF THE INVENTION

The present invention relates to an improved form of the plastic blind-drive rivet. The rivet is provided with annular barbs or projections over at least the lower part of the rivet shank for penetrating into the wood or other material when the rivet shank is radially expanded by an expander pin driven down through the axial bore of the rivet.

A purpose of the invention is to improve the tensile strength of the plastic rivet in the axial direction. This is accomplished by employing an expander pin having a head of sufficient diameter and thickness and a barbed shank which ties itself into the plastic rivet. The pin coacts with the rivet under load to prevent tensile failure of the rivet shank, and to prevent separation of the rivet head from the shank.

A supplementary advantage of the combination of plastic rivet and metal expander pin provided by the present invention is that the joint riveted thereby is substantially tamperproof. The rivets cannot be removed and replaced without damaging the rivet or the panel. Accordingly, such rivets can be used, for example, to attach liner panels to overseas shipping containers. It then becomes impossible to remove the panels of such shipping containers without revealing to a subsequent examination that the containers have been tampered with. This is of importance for example, in defending against smuggling.

BRIEF DESCRIPTION OF THE DRAWINGS

FIG. 1 is a perspective view of one form of plastic rivet and metal expander pin embodying the present invention;

FIG. 2 is an enlarged view in section of the plastic rivet of FIG. 1 looking along the line II—II of FIG. 1;

FIG. 3 is a view in section illustrating the plastic rivet and expander pin after installation;

FIG. 4 is a view in section along the line IV—IV of FIG. 2 showing the rivet prior to expansion;

FIG. 5 is a view in section along the line V—V of FIG. 3 showing the expanded rivet and pin;

DESCRIPTION OF THE PREFERRED EMBODIMENTS

Figure 6:
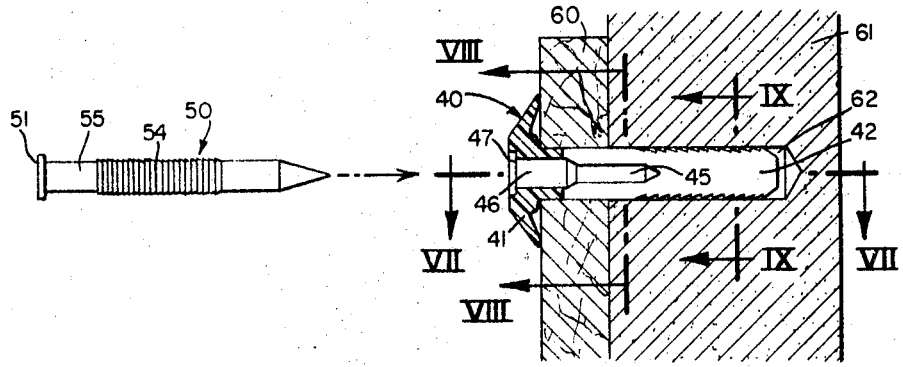
FIG. 6 illustrates another form of plastic rivet and expander pin embodying the present invention.

Referring now to FIGS. 1–5, the reference numeral 10 identifies the plastic rivet and 20 identifies the metal expander pin. The plastic rivet 10 may preferably be of polyamide or polycarbonate while the pin 20 may preferably be of aluminum. The rivet 10 has a head and a Shank. Similarly, the pin 20 has a head and a shank, the overall length of the pin 20 preferably being approximately the same as that of the rivet 10. In the particular embodiment illustrated in FIGS. 1–5, the rivet 10 has an enlarged flat countersunk head 11 while the pin 20 has an enlarged flat head 21. The shank of the rivet is slotted as at 12, the slot 12 extending from a point below the head 11 all the way to the end of the rivet. The rivet 10 also has an axial bore which extends for the full length of the rivet. The bore is of reduced diameter over the major portion thereof, this reduced-diameter portion being identified as 15. Thereabove, the bore diameter increases gradually to fixed diameter forming an intermediate portion identified as 16. At the head end, the bore is of still larger diameter corresponding to the diameter of the enlarged head 21 of the pin forming a shouldered recess 17 for receiving the undersurface of the head of pin 20, as seen in FIG. 3.

In accordance with the present invention, the expander pin 20 is provided with external barbs for an extended central portion 24 of the shank sufficient, when the pin is fully inserted, as in FIG. 3, to lie on both sides of the line A—A which divides the lower barber portion 14 of rivet 10 from the upper unbarbed portion 13. The barbs on pin 20 are preferably annular rings formed, like a buttress thread, with gently sloping lead-in angles to facilitate pin entry into the rivet bore, but having sharp crests and an abrupt back angle to penetrate the walls of the axial bore in the plastic rivet to prevent pull-out or axial motion (elongation) of the rivet shank relative to the pin. For example, the lead-in angle of the barbs may be of the order of 15° relative to the pin axis, while the back angle is 90°. The outside diameter of pin 20 at the barbed portion 24 is considerably larger than the diameter of the reduced portion 15 of the rivet bore, and also larger than the maximum diameter of the intermediate portion 16. For example, where the outside diameter of the barbed portion of pin 20 is .162″, the diameter of the reduced portion of bore 15 may be .094″, and the maximum diameter of intermediate portion 16 may be .149″.

The root diameter of the barbed portion 24 of pin 20 may be equal to the diameter of the unbarbed upper portion 23, and, in the example given hereinabove, may be of the order of .153". The diameter of the head 21 of pin 20 may be .187", equal to the diameter of the enlarged end bore 17 of rivet 10.

As indicated previously above, in the preferred form at least, the barbs on the expander pin 20 cover a sufficiently long central portion of the pin shank that when the pin is fully inserted into the rivet, the barbs on the pin are disposed on both sides of the dividing line A—A which separates the upper unbarbed portion 13 of the rivet from the lower barbed portion 14. The advantages to be gained from this structural combination will become clear by considering the installation illustrated in FIG. 3.

In FIG. 3, the rivet and pin are illustrated installed in a hole 32 which has been previously drilled through a panel 30 and into a second body 31 which, for purposes of the present discussion, may be considered to be wood. The diameter of the bored hole 32 corresponds to the outside diameter of the barbed portion 14 of rivet 10 prior to expansion, and the hole is countersunk to receive the countersunk head 11 of the rivet. The plastic rivet 10 is first inserted into the hole 32 and the metal expander pin 20 is then driven into the axial bore of the plastic rivet 10, to expand the barbed portion 14 of the plastic rivet. The barbs of the rivet 10 are driven into the wood 31, and the barbs of the barbed portion 24 of the aluminum pin 20 become embedded into the walls of the bore of the plastic rivet because of the resilience of the rivet material. The upper unbarbed portion 13 of the rivet is also expanded, the expansion being greatest above the line A—A and below the point where the diameter of the intermediate bore 16 begins to decrease. The enlarged head 21 of the pin is received into the recess 17 with the undersurface of the pin head abutting against the shoulders of the recess.

Consider now the holding power of the combined rivet and pin when a force is applied to remove the panel 30 from the material 31, as viewed in FIG. 3. So long as the material 31 does not break down, the barbs of the plastic rivet 10 retain the rivet firmly embedded in the wood or other material 31. There is, however, a thrust of considerable magnitude in the axial direction of the rivet (to the left as viewed in FIG. 3.) This thrust is taken by the head 11 of the rivet, and assuming the head is of sufficiently large diameter, thickness and strength to withstand the stress, the stress is transferred to the unbarbed upper portion 13 of the shank. This stress tends to elongate the plastic rivet. If the stress were great enough, the plastic rivet would break apart in the vicinity of the lin A—A which divides the unbarbed upper end from the barbed lower portion of the rivet shank.

The barbed aluminum pin provided in accordance with the present invention tends to prevent such elongation and possible rupture of the plastic rivet. The stress referred to above is received on the head and on the shank of the pin 20. The head 21 is of sufficient diameter and thickness to withstand the expected stress. Thus, the head 11 and unbarbed upper portion 13 of the plastic rivet 10 are restained from moving axially to the left independently of the lower barbed portion 14. Removal of the pin 20 independently of the plastic rivet 10 is inhibited by the barbed portion 24 of the pin, the barbs thereof being firmly embedded in the wall of the bore 15 of the plastic rivet and to some extent in the wall of the intermediate bore 16.

The barbs on the pin 20 above the line A—A, not only increase the resistance of the pin against removal from the plastic rivet 10, they also increase to some extent at least the resistance of the unbarbed upper portion 13 of the plastic rivet against removal from the hole 32 independently of the pin 20. For the barbs in this region tend to oppose movement of the rivet shank, to the left as viewed in FIG. 3, relative to the pin.

FIGS. 6–10 illustrate a modified form of plastic rivet and aluminum pin. In FIGS. 6–10, the plastic rivet 40 has a head 41, an unbarbed upper shank portion 43 and a barbed lower shank portion 44. The shank is slotted at 42, the slot 42 extending from a point below the head 41 all the way to lower end of the rivet shank. The rivet head has a larger diameter recess 47 for receiving the head 51 of the expander pin 50, an intermediate bore 46, and a lower bore 45 which terminates just below the line A'—A' which divides the unbarbed upper portion 43 of the rivet from the barbed lower portion 44. Thus, most of the barbed lower portion 44 is slotted but is not bored. This is seen in the cross sectional view of FIG. 9.

The diameter of bore 46 is preferably slightly less than the basic diameter of pin 50, and the diameter of bore 45 is substantially less. For example, the bore 46 may have a diameter of .106", the bore 45 a diameter of .070", the pin 50 a basic or root diameter of .108", and a diameter over the barbs of .116". The slot 42 may have a width of .020".

Figure 7:
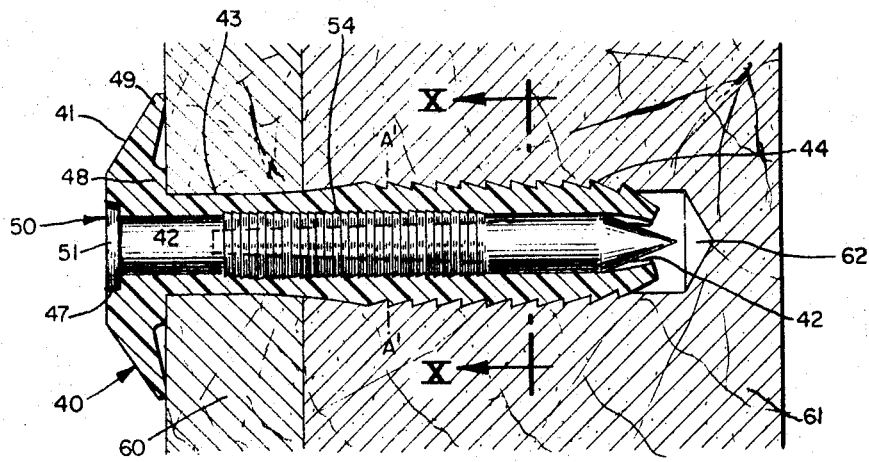
FIG. 7 is an enlarged view in section looking down along the line VII—VII of FIG. 6 showing the plastic rivet and expander pin after installation.
Figures 8, 9, 10:
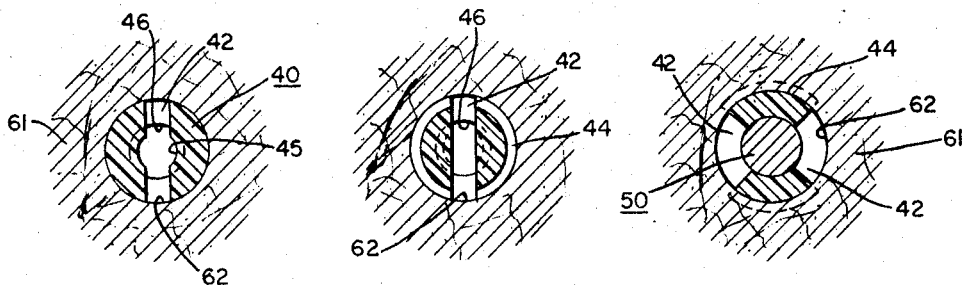
FIGS. 8 and 9 are views in section along the lines VIII—VIII and IX—IX, respectively, of FIG. 6 showing the rivet prior to expansion.
FIG. 10 is a view in section along the line X—X of FIG. 7 showing the expanded rivet and pin.

FIG. 7 illustrates the rivet 40 and expander pin 50 installed or "set" in registered holes 62 pre-drilled in panel 60 and in a wood framing member, wall, or other material 61 and functioning to hold them together.

The head 41 of rivet 40 is shown to be of the "truss" type, and, in accordance with my invention, is provided with a shoulder 48 under the rivet head. The outer edge 49 is relatively thin. For example, the outer edge 49 may be only about .010" thick. Hole 62 has a diameter substantially equal to that of the rivet 40 prior to expansion.

The rivet 40 is inserted in hole 62 and the pin 50 then driven in. When the pin is driven home and the rivet is "set," any further hammer blows will be absorbed by the shoulder 48. This prevents the shock of the blows from being transmitted through the head to the thin outer edge 49, and prevents splitting of the rivet head at the edge.

Except for the differences already noted above, the combination plastic rivet and metal expander pin 40–50 of FIGS. 6–10 is similar to that of FIGS. 1–5, and the description and discussion which applied to FIGS. 1–5 is also applicable to the modified form shown in FIGS. 6–10.

It will be seen that the present invention provides a barbed plastic rivet and metal expander pin wherein the metal pin functions to tie together the barbed and unbarbed portions of the plastic rivet shank as well as the rivet head, thereby lending strength to the rivet shell. The head of the pin has sufficient diameter and thickness to have a head-supporting strength at least equal to the holding strength of the barbs on the pin after they are engaged within the rivet. The barbs on the pin are preferably annular, with a forward slope designed to minify pin insertion forces, a rearward slope designed to magnify pin removal forces, and a crest as sharp as possible to facilitate penetration into the inward pressing walls of the rivet shank. Where the plastic rivet has barbs on the lower portions of the shank but not on the upper, the barbs on the pin should extend over a sufficient length of the pin that a sufficient number of barbs lie on each side of the dividing line between the barbed and unbarbed portion of the rivet shank, so that each rivet section is adequately supported by the pin barbs to inhibit rivet elongation and/or failure when the pin head is seated against the rivet head. For example, there should be at least three or four barbs on each side of the dividing line.

The constructional arrangement shown and described ties the plastic rivet together (head, unbarbed shank portion, and barbed shank portion) and adds great strength to the rivet under axial loading. For example, polyamide rivets which by test have failed in tension equivalent to a 11,000 p.s.i. load on the rivet when an ordinary expander pin is used, have held against tensile loads up to 18,000 p.s.i when the pin of the present application is used. The greater the number of barbs on the pin to tie into the walls of the rivet bore on each side of the dividing line, the greater is the strength added to the rivet.

In those cases where the barbs on the plastic rivet go all the way to the rivet head, the barbs on the pin should be so located as to tie the rivet shank to the rivet head as close as possible to the rivet head, since the barbed portion of the plastic rivet tends to be self-supporting against elongation within the barbed region.

What is claimed is:
1. A fastener comprising:
   (A) a rivet of resilient material having:
      (a) an enlarged head at its upper end,
      (b) an elongated shank the lower portion of which is externally barbed,
      (c) an axial bore through said rivet head and through at least the unbarbed upper portion of said shank,
      (d) said bore being of larger diameter in the upper portion of the bore than in the lower portion thereof,
      (e) said shank being slotted through the barbed lower portion and through a portion of the unbarbed upper portion of the shank,
      (f) said slot communicating with the larger diameter bore of the distal end thereof,
   (B) a rigid expander pin of material harder and stronger than the rivet, said pin having:
      (a) an enlarged head,
      (b) an elongated shank adapted for insertion into the axial bore of said rivet,
      (c) the diameter of said pin shank being substantially larger than the reduced diameter portion of said bore, whereby insertion of said pin expands the reduced-diameetr-bore portion of the rivet shank radially outward,
      (d) the external surface of said pin shank being provided with barbs in the form of fine annular buttress-type sharp-crested rings over a sufficient portion of its length such that when said pin is fully inserted into its final position in said rivet bore a substantial number of barbs on said pin are in engagement with the walls of said bore both above and below the line which divides the barbed lower portion of the rivet shank from the unbarbed upper portion,
      (e) the radial height (between root and crest) of said barbs being less than .010 inch to provide barbs of an axial pitch small enough to allow a large number of barbs per unit length of pin but of sufficient radial height to provide adequate engagement with the rivet bore wall,
      (f) said barbs adjoining each other, the forward slope of the barbs beginning at the boundary line of the backslope of the adjoining barb;
   (C) said enlarged head of said rivet having a recess therein corresponding in size and shape to said enlarged head of said pin, the larger diameter portion of the axial bore below said recess being of smaller diameter than said recess forming abutment shoulders for receiving the undersurface of the head of the pin for preventing inward movement of said pin relative to said rivet.

References Cited

UNITED STATES PATENTS

| 2,759,389 | 8/1956 | Corckran | 85—21 |
| 3,022,701 | 2/1962 | Potruch | 85—83 |
| 3,198,058 | 8/1965 | Barry | 85—84 |
| 3,199,398 | 8/1965 | Weisz | 85—83 |
| 3,203,304 | 8/1965 | Rapata | 85—83 |
| 3,319,918 | 5/1967 | Rapata | 85—82 |
| 2,569,826 | 10/1951 | Packard | 85—84 |
| 2,956,605 | 10/1960 | Rapata | 85—80 |

FOREIGN PATENTS

| 72,483 | 12/1893 | Germany. |
| 1,381,750 | 11/1964 | France. |
| 857,371 | 12/1960 | Great Britain. |
| 899,013 | 6/1962 | Great Britain. |
| 991,375 | 5/1965 | Great Britain. |
| 321,922 | 10/1934 | Italy. |
| 406,126 | 2/1934 | Great Britain. |
| 780,878 | 8/1957 | Great Britain. |

MARION PARSONS, Jr., Primary Examiner

U.S. Cl. X.R.

85—21, 84